May 1, 1923.
H. TAYLOR
1,453,295
DEMOUNTABLE RIM LOCK
Filed March 6, 1920
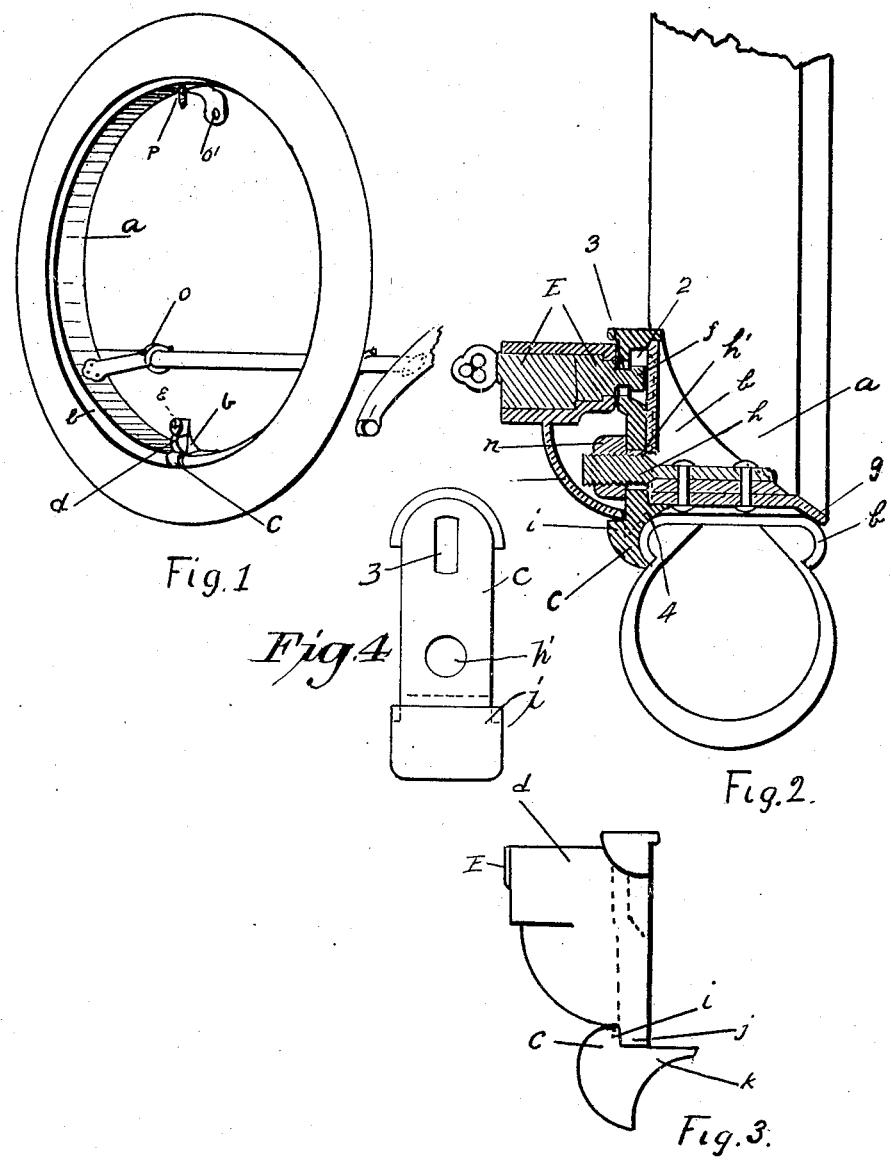
Witnesses
J. M. Taylor
F. A. Holme
INVENTOR
Huston Taylor
BY
ATTORNEY Patented May 1, 1923.

1,453,295

UNITED STATES PATENT OFFICE.

HUSTON TAYLOR, OF DETROIT, MICHIGAN, ASSIGNOR TO DETROIT CARRIER AND MANUFACTURING COMPANY, OF DETROIT, MICHIGAN, A CORPORATION OF DELAWARE.

DEMOUNTABLE-RIM LOCK.

Application filed March 6, 1920. Serial No. 363,847.

*To all whom it may concern:*

Be it known that I, HUSTON TAYLOR, a citizen of the United States, residing at Detroit, county of Wayne, and State of Michigan, have invented a new and useful Demountable-Rim Lock for Use on Motor-Driven Vehicles, of which the following is a specification.

My invention relates to improvements in locks for spare tire carriers, and particularly to a lock in combination with the clamping device on carriers, whereby the operating nut or screw which holds the clamp or wedge against the demountable rim may be protected against unauthorized operation.

The invention relates further to a covering of the operating mechanism of a tire carrier clamp to protect said mechanism from dust and water.

The invention relates further to the permanent installation of a lock in the clamping mechanism for spare tire carriers.

I attain these objects by the mechanism illustrated in the accompanying drawing, in which—

Figure 1 is a perspective of a spare tire on a demountable rim installed on a ring type of tire carrier, supported by brackets on a fragmental section of a motor driven vehicle, showing my locking device at the base of the carrier ring.

Figure 2 is a vertical section of a locking device and a clamping wedge, as applied to a fragmental section of a spare demountable rim, omitting the details of the lock.

Figure 3 is a side elevation of the locking device and clamping wedge, designed to hold a demountable rim to a carrier.

Figure 4 is a rear elevation of the clamping element shown in Fig. 2.

Similar reference characters refer to like parts throughout the several views.

Extra demountable rims and fully inflated spare tires of motor vehicles are often mounted on cylindrical carriers which are usually attached to the rear ends of the vehicles, as shown in the drawings, the carriers $a$ being supported by arms $o$ and $o'$ which constitute a permanent part of the vehicle. The cylindrical carrier $a$ is preferably provided with a flange $g$ to limit the forward movement of the rim. The removal of the rim may be prevented by a plurality of devices, one of the simplest being a nut screwed onto the tire-valve P which extends down through a hole in the carrier $a$ as shown in Fig. 1.

Secured to the inside of the carrier $a$ preferably at the bottom, is a bracket $b$ (Fig. 2) to which a bolt $h$ is permanently attached. A wedge plate C is secured to the bracket $b$ by means of this bolt, being provided with a hole $h'$ therefor. This wedge plate has a recess 2 at its upper end into which the elongated aperture 3 connects, and a wedge 4 which is adapted to extend between the carrier $a$ and the curved edge of the rim $b'$. When the nut $n$ is screwed down against the wedge plate C, this wedge 4 will prevent the removal of the rim and the tire thereon. The present invention provides means to prevent the unauthorized removal of this nut.

A housing $d$ is so formed as to enclose this nut when properly positioned and is provided with jaws $j$ (Fig. 3) which engage behind the shoulders $i$ on the wedge plate C as shown in Fig. 3. A cylinder lock barrel E is mounted in the upper part of this housing and has a T shaped bolt $f$ adapted to be passed through the slot 3 in the wedge plate. When therefore the housing $d$ is properly positioned, and the lock barrel E is turned to bring the bolt $f$ horizontally across the slot 3 and the key is withdrawn, the nut $n$ cannot be reached.

The details and proportions of the constructions embodying my present invention may all be changed by those skilled in the art without departing from its spirit, as set forth in the following claims.

I claim:—

1. In combination with a ring on which a tire rim is adapted to be mounted, of a bolt extending from said ring parallel to the axis of the ring, a wedge plate mounted on said bolt and having a projection adapted to enter between the rim and the ring, a nut to hold the wedge plate in position to secure the rim on the ring, said wedge plate having a shoulder on one side of the bolt and an aperture on the opposite side of the bolt, a housing adapted to fit over said nut and prevent access to the nut, said housing having an extension adapted to engage said shoulder, and a key-operated lock mounted in the housing and provided with an engaging member adapted to enter the aperture in the wedge plate to secure the housing in position.

2. In combination with a ring on which a tire rim is adapted to be mounted, a bolt mounted on the ring, a wedge plate mounted on the bolt and having one end formed to fit tire rims and also formed with a shoulder adjacent said end and an aperture adjacent the opposite end, a nut on the bolt to secure the wedge plate in position, a cover for said nut adapted to have one end engage the shoulder on the wedge plate, and a lock mounted in said cover provided with a bolt adapted to engage in the aperture in said wedge plate to hold the cover in position over the nut.

HUSTON TAYLOR.

Witnesses:
FRED ALMON HOLMES,
JANE MARION TAYLOR.